UNITED STATES PATENT OFFICE.

BYRON E. ELDRED, OF NEW YORK, N. Y., ASSIGNOR TO THE COMMERCIAL RESEARCH COMPANY, OF NEW YORK, N. Y., A CORPORATION OF NEW YORK.

PROCESS FOR THE PRODUCTION OF COMPOUND METAL ARTICLES.

1,140,135.

Specification of Letters Patent.

Patented May 18, 1915.

No Drawing.

Application filed December 30, 1914. Serial No. 879,733.

*To all whom it may concern:*

Be it known that I, BYRON E. ELDRED, a citizen of the United States, residing at New York, county of New York, and State of New York, have invented certain new and useful Improvements in Processes for the Production of Compound Metal Articles, fully described and represented in the following specification.

This invention relates to a new process for the production of compound metal articles.

The general object of the invention is to provide a process by which a compound metal article may be produced having a predetermined rate of expansion.

A further object of the invention is to provide a process for producing a compound metal article having a predetermined average coefficient of expansion over any required range of temperatures, the rate of expansion of the article being reasonably close to uniformity over such range of temperatures.

While there are many uses to which such a compound metal article may be put, the new process is particularly important for the production of wires which are to serve as conductors, as, for example, the leading-in wires for incandescent lamps, because it permits the lamp-maker to select a type of glass valuable for its properties other than a particular coefficient of expansion, with the knowledge that, when a selection has been made, a wire can be produced which has all the requisite properties for a good leading-in wire, including a coefficient of expansion near enough to that of the glass to enable a seal to be made and maintained between such leading-in wire and the particular glass selected.

Platinum has heretofore been used as a leading-in wire, because it was the only metal combining various characteristics essential to success. Its coefficient of expansion was low as compared with most other metals. It had a high-melting point and therefore would stand the heat of sealing-in. It had a non-oxidizable surface, so that glass would adhere to it and thereby produce a clinging union. Hence, if, as was generally the case, the lampglass had a coefficient of expansion slightly below that of the platinum, a union between the leading-in wire and the glass would be maintained during contraction, this being due to the elasticity of the glass which, on account of its clinging union with the wire, would allow for the greater contraction of the platinum and still maintain the necessary seal. In this case, the glass around the leading-in wire was put under a tensile strain. Platinum is a sufficiently good conductor of electricity for the purpose intended and hence could be used in a size small enough to permit sealing with the glass. There is some difficulty in making a seal where the leading-in wire is too large, because the absolute diametral expansion of the wire unduly strains the glass, unless the coefficients of expansion of the wire and the glass are identical, which is very rarely the case. While other metals of the platinum group have characteristics similar to platinum, the latter was generally employed because it is a most convenient one to obtain. Platinum, however, has a number of disadvantages for use as a leading-in wire, the most important of which is the fact that its coefficient of expansion is unalterable by art. Hence, when platinum is to be used as a leading-in wire, the selection of the type of glass to be used is controlled by the coefficient of expansion of platinum. Therefore, the lamp-maker was confined in his selection of glasses to those having a coefficient of expansion as near as possible the same as that of platinum, since otherwise a seal could not be made and maintained between the glass and the leading-in wire. A further disadvantage of platinum was that, owing to the way it is manufactured, it sometimes has defects or imperfections which are not visible except by the very closest inspection. Such defects or imperfections permit air to leak into the lamp. Owing to the fact that platinum in the small sizes which it was necessary to use to obtain a good seal was relatively weak, its manipulation is more difficult and, as the platinum is expensive, considerable care was required in handling the short pieces of wire in order to avoid serious losses.

While many attempts have been made heretofore to produce substitutes for platinum as a leading-in wire, these attempts have not resulted in any appreciable success, for reasons well known to those skilled in the art.

The present invention consists in a process of producing a compound metal article comprising a core and a sheath, with a predetermined coefficient of expansion. In carrying out the invention, the core is made of a metallic material whose coefficient of expansion is different from that of the sheath. The coefficients of expansion of the core and sheath are so related that one coefficient is below the predetermined coefficient of expansion for the compound article, while the coefficient of the other is above the said predetermined coefficient of expansion. That is to say, a compound metal article may have a core whose coefficient of expansion is distinctly below that predetermined, while the sheath has a coefficient of expansion distinctly above that predetermined, the sheath being so united to the core that the compound metal article will have a resultant coefficient of expansion substantially that predetermined, this being obtained by so adjusting the thickness of the sheath relative to the diameter of the core as to obtain the desired result. In some cases, the coefficient of expansion of the core may be greater than the predetermined value, in which case the coefficient of expansion of the sheath must be below the predetermined value. By this method of production, it becomes possible to make bars, rods or wires having substantially any required predetermined coefficient of expansion within wide limits.

As the coefficients of expansion of the elementary metals do not in all cases give a sufficient range of selection, alloys may be used either for the core or for the sheath, or for both. For producing leading-in wires, it is important that the compound wire shall have a high-melting-point and be a relatively good conductor of electricity. Furthermore, the union between the core and sheath must be such as to prevent leakage of air between the two. Therefore, in carrying out the process for the production of a leading-in wire, the core should have a coefficient of expansion distinctly below that required in the completed wire, while the sheath has a coefficient of expansion distinctly above that predetermined for the completed wire. In this way, the sheath will be caused to compress the core at all of the usual temperatures encountered by the wire in the manufacture of lamps, the contraction of the sheath onto the core assisting in insuring a satisfactory union of the core and sheath.

As the coefficient of expansion which a leading-in wire must have is approximately the same as that of the glass with which it is to be used and is relatively low as compared with the coefficients of expansion of high-melting metals, it is not possible to select an elementary metal for the core, since none of them have a coefficient of expansion low enough for the purpose desired. Therefore, the core is formed of an alloy of high-melting metals but having a relatively low coefficient of expansion. Among such alloys, the nickel-iron alloy (often referred to as "nickel-steel") is particularly advantageous, for the reason that, by a variation in the proportions of the constituent metals, a considerable variation in the coefficients of expansion of the alloy may be obtained. Unfortunately, however, the rate of expansion of a nickel-iron alloy is very irregular, so that at some temperatures the rate of expansion departs materially from the average rate of expansion of the alloy from normal to the temperatures employed in sealing the wire into the glass. By the present process, however, a wire may be produced with a coefficient of expansion reasonably regular between the normal temperature and the sealing-in temperature, while at the same time employing a core of nickel-iron alloy. This is due to the fact that, by producing a nickel-iron alloy core having a coefficient of expansion distinctly below that required of the completed wire, a sheath may be employed of appreciable thickness, so that, when the sheath having a relatively high coefficient of expansion is united to the core, the expansion of the sheath which is reasonably uniform tends to control the expansion of the core in such a way that the resultant wire has a reasonably regular rate of expansion between the required temperatures.

Many methods may be employed in forming the union between the sheath and core. For example, a sheath of high-conductive, high-melting material, such for example as silver or copper, may be united integrally to the nickel-iron core by a weld union produced in accordance with the process described in the United States patent to Monnot No. 853,716.

While an integral union between the sheath and the core is highly advantageous and results in a wire of great reliability, the invention is not to be limited to a wire made in that way. It is an important feature of the present invention that a satisfactory wire can be produced even where the union between the sheath and core is not of such a nature as to be termed integral. The reason why the weld union is not an absolute necessity is because, by making the core material so that its average coefficient of expansion from the normal to the sealing-in temperature is distinctly less than the corresponding coefficient of the glass with which it is to be used, while the corresponding coefficient of expansion of the sheath metal is distinctly above that of said glass, the sheath metal will contract strongly against the core so that the usual union formed by soldering, hammering, hot swaging, or other well-known process, will be sufficient to prevent any leakage between the core and sheath.

In making the wire, it is very advantageous to combine the core and sheath in billet form and then roll and draw or otherwise work the billet down to wire of the desired size, because of the ease of inspection, measurement of constants, and manipulation in working with a large body such as a billet.

It is particularly to be noted that with the present invention the coefficient of expansion of the glass from which the lamp is to be made is the controlling factor. The type of glass to be used having first been selected and its average coefficient of expansion from about zero degree centigrade or normal temperature to the temperature at which the glass softens under heat being ascertained, the constants of the wire may then be determined.

The proportions of nickel and iron in the core metal are intended to determine the coefficient of expansion of the core. In practice, it is difficult to obtain commercially a core material of a uniform, predetermined coefficient of expansion. It is supposed that this lack of uniformity in nickel-iron alloy is due to accidental uncontrollable variations in the heat treatment when uniting the constituent metals of the alloy. Since, therefore, billets of nickel-iron alloy, of a uniform coefficient of expansion, cannot be obtained conveniently on the market, it is an important feature of the present invention that, notwithstanding the variations from the desired standard in the core metal, a wire having a substantially uniform coefficient of expansion may be produced by the use of a sheath of the proper thickness, as will be hereinafter more fully explained.

A further peculiarity in the expansion of the core metal is that, if the expansions through the necessary range of temperature be platted, the curve of such expansions will at some temperatures depart materially from the average coefficient of expansion from zero to the sealing-in temperature at which the glass sets. Hence, it may be said that in general practice, the usual predetermination of proportions of nickel and iron will result only in a fair approximation to the predetermined coefficient of expansion of the core, the variations usually being sufficient to be disadvantageous in practice. By the present invention, this disadvantage may be overcome because the proportion of sheath metal to the core, that is to say, the thickness of the sheath may be readily varied to determine the resultant average coefficient of the finished wire. Hence, a core billet of the required composition may be provided with a sheath metal of high-conductive, high-melting material, having a thickness such that the compound billet will give the required average coefficient of expansion. In practice, the thickness of the sheath metal as first applied may be greater than is necessary. The billet may then be tested as to its coefficient of expansion and the surplus metal of the sheath turned off to the required diameter to give the resultant average coefficient of expansion which is required. The billet may then be worked down to wire of the desired size. It will be seen that a great advantage of the invention is that the coefficient of expansion may be controlled in a reliable manner during the manufacture by varying the thickness of the sheath. Furthermore, since sheath metal of the kind necessary in carrying out the invention has a rate of expansion which is fairly uniform and may be considered as rectilinear, the sheath metal tends to straighten out the curve of expansion of the core metal and thus produces a composite wire whose curve of expansion does not depart to an injurious extent from the average coefficient of expansion required in the wire. It is partly for this reason that a composite wire made in accordance with this invention satisfactorily maintains a seal at all temperatures to which the lamp will be subjected in manufacture and in use.

While the proportions of the constituent metals in the nickel-iron core may be varied to a considerable extent, and the proportion in thickness of the sheath metal to the diameter of the core may also be varied as desired, it is important that in every case the coefficient of expansion of the core shall be distinctly less than that of the glass with which the wire is to be used, in order that the sheath metal will always contract sufficiently onto the core to maintain a reliable union between the sheath and core.

A few specific examples illustrative of the invention will now be given in connection with the production of leading-in wires.

Assuming that the type of lampglass selected has an average coefficient of expansion of about 89 or $90 \times 10^{-7}$ and that the completed leading-in wire is to have about the same coefficient, a nickel-iron core metal may be selected having a composition of about 38% to 45% nickel. The average coefficient of expansion of this core would be approximately from $42 \times 10^{-7}$ to $77 \times 10^{-7}$. Such a core may then be provided with a sheath of suitable high-melting, high-conductive material, such, for example, as silver, copper or gold, which sheath may be applied to the core in any of the well-known ways. When the core has an average coefficient of expansion of about $42 \times 10^{-7}$, as before suggested, the sheath, if of silver, would be about 65% of the weight of the entire billet; if of copper, the sheath would be about 60%; and if of gold, about 75%. The composite billet may be tested to determine its average coefficient of expansion, which should be about that, or not much greater than that, of the glass with which it is to be used. If it be found that the average coefficient of expansion of the billet is too great, the composite billet may be put in a lathe and some of the sheath metal turned off, after which a further test of the coefficient may be made. If the coefficient is too low, a heavier sheath may be supplied to the core. The proper constants of the billet having been obtained, the billet is then worked down to wire of the desired size, and usually to about .006 inches to .015 inches in diameter, according to the size of lamp with which it is to be used. It will be obvious from a consideration of the above example that a certain amount of accuracy is required in making such wire, in order that its coefficient of expansion shall not at any time be too greatly above that of the glass. It should not be more than 105% that of the glass with which it is used. Since it is difficult to avoid some variations in different lots of glass, it is obvious that in the use of a wire whose coefficient is intended to be the same as the glass or to be within certain limits above the glass with which it is to be used, there is room for mistakes which may result in failures of some lamps, unless careful supervision of the work is maintained at all times. Hence, when such supervision is undesirable, a leading-in wire whose coefficient of expansion is less than that of platinum is safer in practice, and further advantage is obtained by having its average coefficient of expansion less than that of the glass with which it is used.

As an example of a lamp provided with a leading-in wire whose average coefficient of expansion from normal temperatures to the temperature at which the glass sets to the solid state from its softened condition is less than the glass, the following is submitted as illustrative: With glass having an average coefficient of expansion of, say, $89 \times 10^{-7}$ from common temperatures up to 300° C. (which would probably average about $93 \times 10^{-7}$ up to the softening point of the glass), the leading-in wire may have an average coefficient of expansion lying between $60 \times 10^{-7}$ and $75 \times 10^{-7}$ for temperatures up to 300° C. With a leading-in wire of this description, the pressure between the wire and glass in the completed lamp is sufficient to insure a tight joint and at the same time is not so great as to cause cracks in the stem of the lamp. In making such a wire, the core of nickel-iron alloy may contain about 38% nickel. Such a core material will have an average coefficient of expansion up to 100° C. of about $25 \times 10^{-7}$. Up to 300° C., its average will be about $42 \times 10^{-7}$; and at the sealing-in temperature, its average coefficient of expansion will be about $65 \times 10^{-7}$. A billet of this alloy may be provided, by any suitable method, with an outer layer or sheath of copper. This layer may then be turned down in a lathe to the exact thickness required to give the desired resultant coefficient of expansion, which may be determined by test of the composite billet. The billet may then be drawn or swaged, or otherwise worked, into wire and annealed.

In ordinary practice, the core rod of nickel-iron alloy may be 0.892 inches in diameter, and after the copper sheath is attached thereto, the composite billet may be turned down to a cylinder of 1 inch diameter. The wire may be drawn down to a diameter of from .008 to .015 inch.

While the invention has particularly been described in connection with the production of leading-in wires for incandescent lamps and the like, it is to be understood that it is not limited to this use, but is generally applicable to the production of a billet, bar, rod, wire or filament whose coefficient of expansion must be predetermined.

What is claimed is:

1. The process of producing a composite metallic body with a predetermined coefficient of expansion, which consists in uniting a sheath of one kind of metallic material to a core of a different kind of metallic material, the core and sheath having different coefficients of expansion, one being greater and the other less than the required predetermined coefficient of expansion, the thickness of the sheath being so adjusted relative to the size of the core as to give to the composite metallic body a resultant coefficient of expansion substantially that predetermined.

2. The process of producing a composite metallic body with a predetermined coefficient of expansion, which consists in forming a core of alloy whose constituents are proportioned to give approximately a predetermined coefficient of expansion different from that required for the metallic body, and uniting to this core a sheath of metallic material whose coefficient of expansion is different from that of the core, the coefficients of expansion of the core and sheath being one greater and the other less than the required predetermined coefficient of expansion of the composite metallic body, the thickness of the sheath being so adjusted relatively to the diameter of the core as to give to the composite metallic body a resultant coefficient of expansion substantially that predetermined.

3. The process of producing a high-conductive wire having a predetermined coefficient of expansion through a required temperature range, which consists in combining nickel and iron in such proportions as to form an alloy having an average coefficient of expansion, through the same temperature range, distinctly below the predetermined average, and uniting with said core a sheath of high-melting, high-conductive material whose average coefficient of expansion through the required range of temperatures is distinctly above the predetermined average, the thickness of said sheath being so adjusted as to give a resultant average coefficient of expansion of the compound wire substantially that predetermined.

4. The process of producing a high-conductive high-melting wire of predetermined average coefficient of expansion through a required temperature range, which consists in forming a billet core of an alloy of nickel and iron, having the constituent metals so proportioned as to give a resultant average coefficient of expansion through the required temperature range materially below the predetermined average, uniting with said core a sheath of high-melting high-conductive material whose average coefficient of expansion through the required temperature range is distinctly above the predetermined average, the thickness of the sheath being adjusted so as to give a resultant average coefficient of expansion of the composite wire substantially that predetermined, then working the compound billet so formed into wire of the required size.

5. The process of producing a high-conductive high-melting wire of a predetermined average coefficient of expansion through a required temperature range, which consists in uniting nickel and iron in such proportions as to form an alloy whose average coefficient of expansion is below the required predetermined value, forming a core of this alloy, uniting to the core a sheath of high-melting high-conductive material having a coefficient of expansion distinctly above the required predetermined value, adjusting the thickness of the sheath relatively to the core to give a resultant coefficient of expansion of the compound metal article substantially equal to the required predetermined value, and then working the compound metal article to wire of the desired size.

In testimony whereof, I have hereunto set my hand, in the presence of two subscribing witnesses.

BYRON E. ELDRED.

Witnesses:
A. WHITE,
M. C. MASSIE.